June 27, 1939.　　　C. G. MUNTERS　　　2,164,143
INSULATION
Filed Nov. 1, 1935　　　3 Sheets-Sheet 2
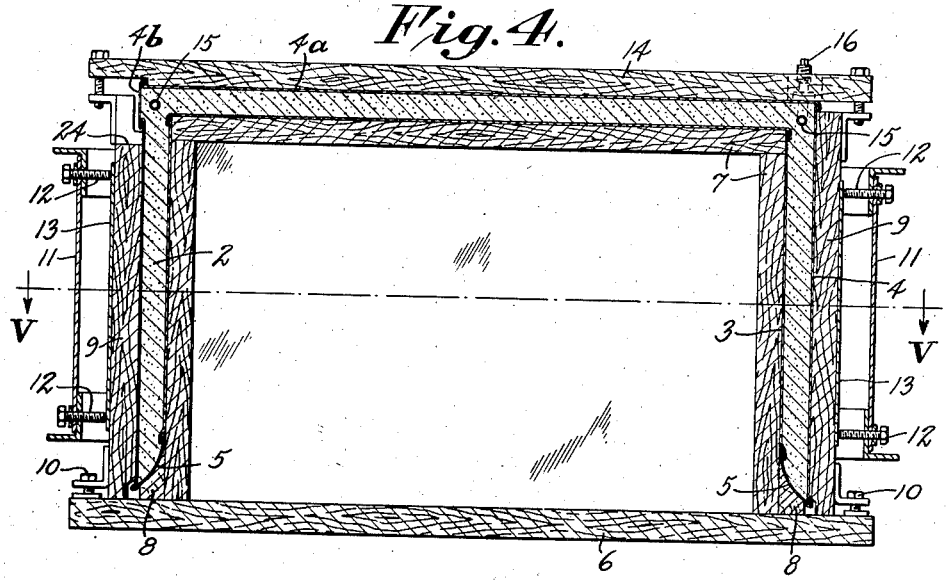
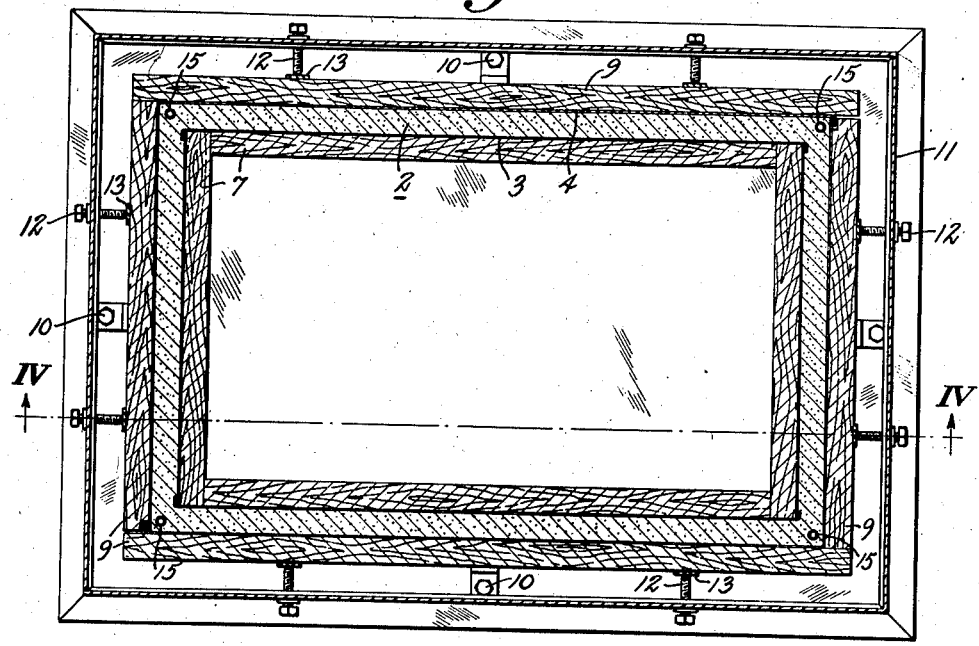
INVENTOR,
Carl Georg Munters
BY
ATTORNEY.

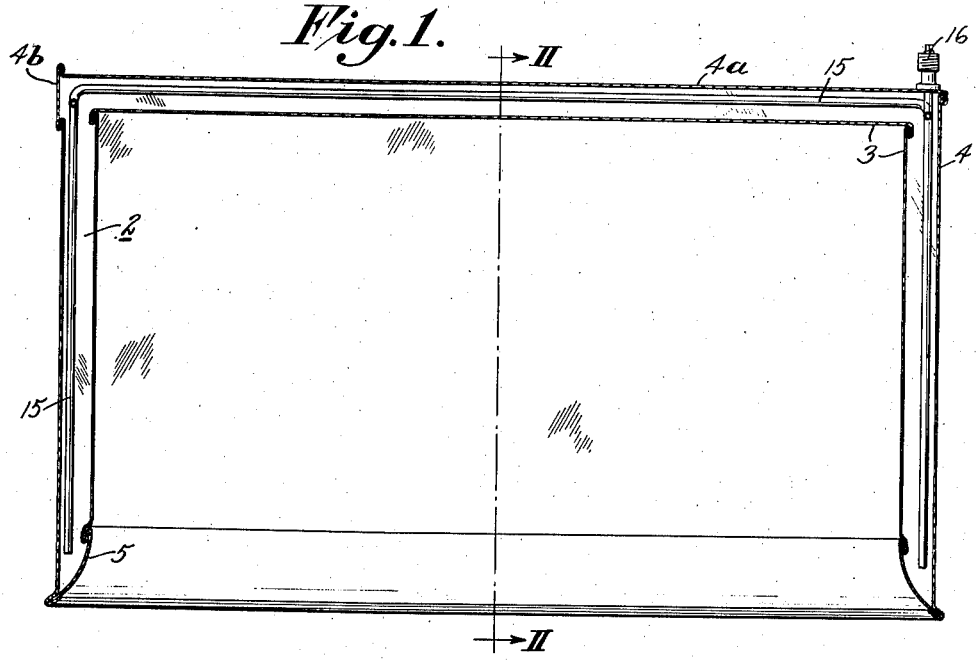
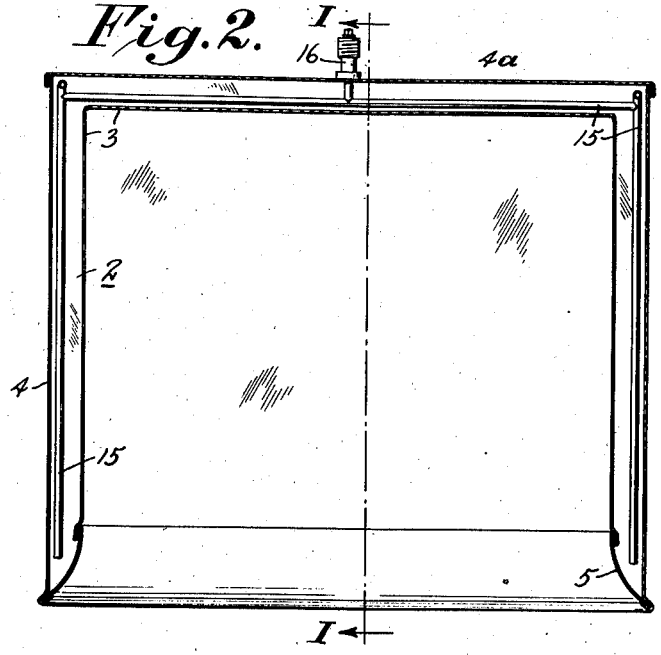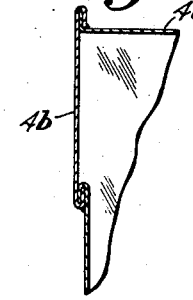

June 27, 1939.   C. G. MUNTERS   2,164,143
INSULATION
Filed Nov. 1, 1935   3 Sheets-Sheet 3
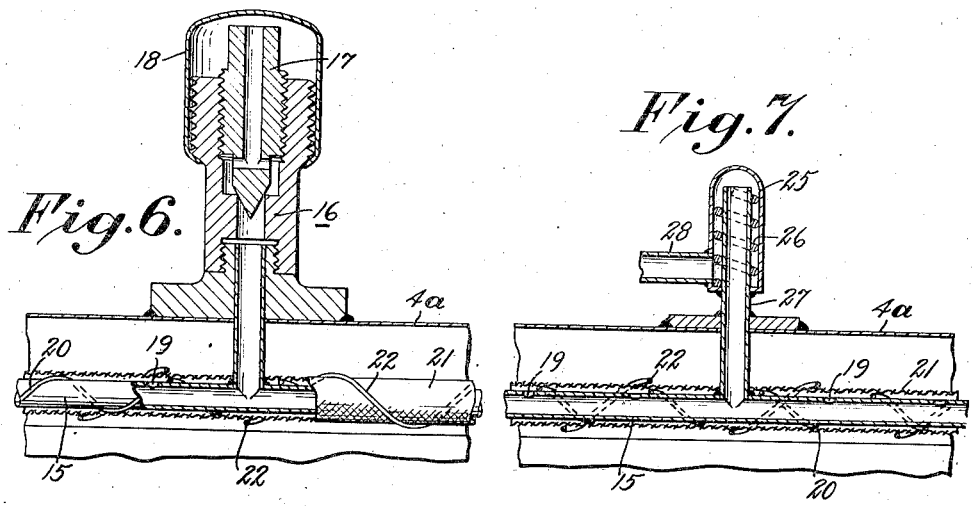
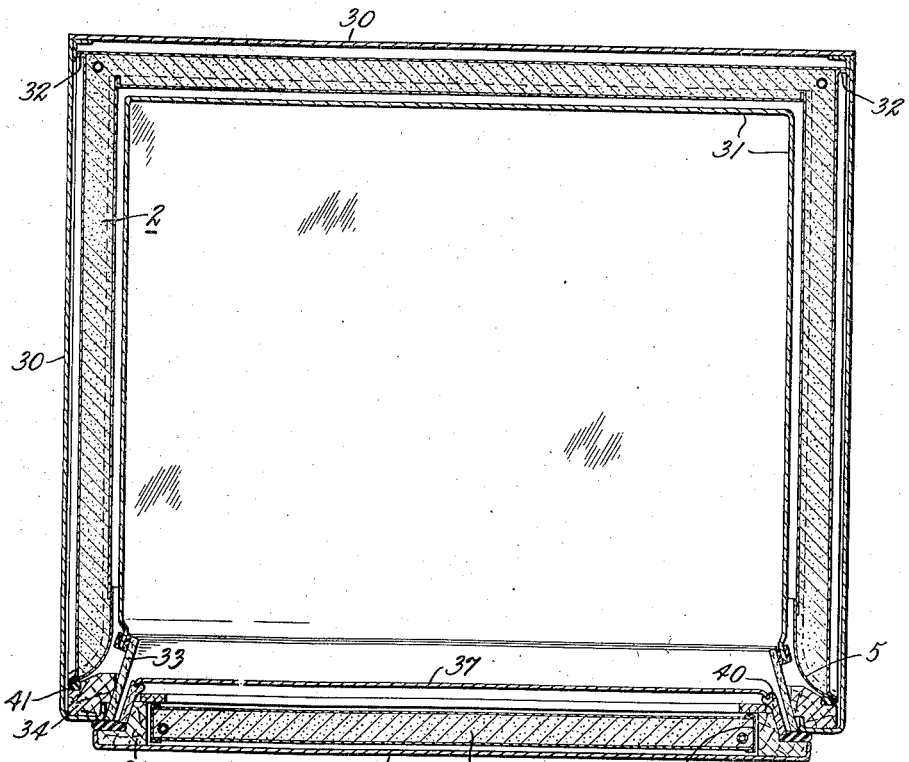

Patented June 27, 1939

2,164,143

UNITED STATES PATENT OFFICE 2,164,143

INSULATION

Carl Georg Munters, Stockholm, Sweden, assignor to Aktiebolaget Termisk Isolation, Stockholm, Sweden, a corporation of Sweden Application November 1, 1935, Serial No. 47,825
In Sweden November 10, 1934

9 Claims. (Cl. 220—9)

My invention relates to insulations and their manufacture. More particularly my invention relates to insulation structures including a space which is at a different pressure than atmospheric pressure.

One of the objects of my invention is to provide an insulation structure having a pressure differential between the space within the same and atmosphere of considerable magnitude while using plates or covering of very thin and flexible material.

Another object of my invention is to provide an insulation having a space or spaces from which air has been evacuated, either containing or not containing some other gas, in which the gaseous pressure differential is equalized by a mechanical pressure component.

Another object is to provide equalization of the mechanical pressure which offsets the gaseous pressure.

In forming an evacuated insulation member I preferably utilize a filler, which filler, in the course of preparation of the insulation, is given a mechanical pressure preponderating over atmosphere, so that upon evacuation and the consequent removal of a gaseous pressure component the mechanical pressure component of the filler constitutes an equalizing agent providing stability, rigidity and preventing deformation, despite the use of material which in and of itself is unsuitable.

The nature of my invention will become apparent from a consideration of the following description taken in conjunction with the accompanying drawings forming a part of this specification and of which:

Fig. 1 is a sectional view of insulating structure embodying the invention, in which the filling is omitted for the sake of clarity, and is taken on the line I—I of Fig. 2;

Fig. 2 is a sectional view taken on the line II—II of Fig. 1, in which the filling is omitted for the sake of clarity;

Fig. 3 is an enlarged view of a part of the structure shown in Fig. 1;

Fig. 4 is a sectional view showing insulation in accordance with the invention placed within a fixture for making the same, and is taken on the line IV—IV of Fig. 5;

Fig. 5 is a sectional view taken on the line V—V of Fig. 4;

Fig. 6 is a sectional view of a part of insulation structure in accordance with the invention showing valve structure;

Fig. 7 is a modification of the structure shown in Fig. 6; and

Fig. 8 is a sectional view of a refrigerator cabinet including insulation in accordance with the invention.

The structure shown in Figs. 1 and 2 includes an inner shell or wall 3 and an outer shell or wall 4. These shells are nested but spaced so that a space 2 is formed between them. At their open ends the shells or receptacles are connected by a strip 5. Preferably the inner and outer shells 3 and 4 and the strip 5 are made of thin flexible sheet metal. In this particular embodiment the structure selected for purpose of illustration is that of insulation for a cabinet having one side open to be closed by a door. The purpose of the insulation is to prevent flow of heat between the space exterior to the structure as a whole and the space within the inner shell 3. The shells 3 and 4 are made up of plates which may be said to extend transversely to the direction of heat flow whereas the strip 5 extends in the direction of heat flow. In other words, it constitutes a possible heat conducting element between the inner and outer shells. The strip 5 should therefore be made to have as little heat transmitting capacity as possible so as to break the flow of heat. Preferably I use a metal of poor heat conducting quality, such as a nickel-iron alloy. When completed the structure is hermetically sealed and the joints may be welded or otherwise hermetically sealed.

The space 2 is filled with a finely divided material of the nature of carbon or kieselguhr. In order to fill this space the structure is made up in the form shown in Figs. 1 and 2 with the exception of the wall 4a which is left off until the material is filled in. A metal band 4b may be provided as a connecting element between the wall 4a and the remainder of the shell 4. After filling the mass into the space 2 the structure is closed and hermetically sealed, after which a vacuum is produced in the space 2.

Inasmuch as the nature and characteristics of my insulation will be best understood by considering the process of manufacture, I will now explain how the insulation receptacle is filled. The fixture shown in Fig. 4 includes a bed plate 6 on which is fixedly mounted a dome-like member 7 which may, for example, be made of wood. The outer dimensions of the dome 7 correspond to the inner outline of the insulating receptacle in its ultimate form. In the particular structure shown in Fig. 1, the breaker strip 5 is oblique to the shells 3 and 4 and somewhat curved. In order to support this part of the structure I provide ledges or extensions 8 at the lower part of the dome 7 having contours to fit the breaker strip 5. Spaced outwardly from the rectangular dome 7 are exterior supporting walls 9. These plates 9 are detachably held to the base 6 by means of any suitable devices 10 which are of such construction as to permit movement and adjustment of the fixture as hereinafter described. The four exterior forming walls 9 are surrounded by a double frame 11 which may be suitably supported in any desired manner and which is a unitary structure whereby by means of turnbuckles 12 and bars 13 pressure may be exerted to move the walls 9 inwardly. The fixture also includes a detachable cover 14.

The structure comprising the inner and outer shells 3 and 4, with the exception of what might be termed the top plate 4a but including the breaker strip 5 (in other words, ready to be closed and hermetically sealed upon assembly with the cover 4a and the sealing strip 4b) is placed over the dome 7 and between the dome 7 and the exterior fixture walls 9. A pipe system 15 (Fig. 1) is placed within the space 2 in order to evacuate the space 2. This consists of perforated tubing extending within the different parts or branches of the space 2 so as to equalize the suction effect. The space 2 is now filled with the comminuted filler. In accordance with the preferred procedure, so much of this interior mass is filled in that when the cover 14 is put on and the walls 9 are in a position corresponding to the ultimate contour of the insulation, there is an internal pressure or outward force against the walls of the receptacle during filling corresponding to the pressure which the mass has to withstand after evacuation. As the mass is filled into the vertical branches of the insulation it can be packed in while the walls 7 and 9 are in their proper places so as to give an outward pressure. It is to be borne in mind that one object of the invention is to utilize sheet metal which is extremely thin, and it will be seen that in accordance with the invention the packing of the material is made possible by means of the fixture holding the insulation receptacle in proper form. This permits any thinness of metallic wall. If the ultimate pressure within the space 2 is to be, for example, ½" of vacuum, or substantially complete vacuum, the pressure differential on the insulation is thus approximately 1 atmosphere. Consequently the filler may be packed into the space 2 with a pressure approximately equal to 1 atmosphere. Then when the insulation is eventually evacuated, the filler will equalize the preponderance of exterior gas pressure over the interior gas pressure. As the material is filled in and packed in the insulation cover air will be expelled as the particles of the filler are squeezed closer together. The packing of the material into the insulation may be effected by shaking the insulation as a whole. The base 6 instead of being stationary, may be mounted upon a jiggling machine.

After the vertical branches or sides of the insulation space 2 have been filled with the powdered or granular material to a suitable degree, the bottom 4 is attached. The cover 14 is then applied and placed in its proper place, whereupon the filler mass in the horizontal space at the top of Fig. 4 is packed by manipulation through the opening 24 in the fixture and a removable piece such as the band or cover 4b which constitutes the final closure except for the sealing valve of the evacuation system.

Upon evacuation, which now takes place, the insulating structure is preferably maintained in the forming fixture. A vacuum pump is connected to the pipe system 15 by means of a valve 16 and the air is evacuated from the insulation. As the air is evacuated the internal pressure is relieved and the filling mass enters into action to provide an internal mechanical force or pressure as distinguished from a gaseous force or pressure to equalize the preponderance of external gaseous force upon evacuation. The thin metal covering presses against and adjusts itself to the filling material so that it is practically free of any pressure or force. Although the metallic shell of the insulation is itself yieldable, and although the interior mass is of itself of no use in forming a firm structure, the two when used together and made up as herein described form a rigid construction. Insulation made in accordance with the invention is able to withstand bending strains to a great degree. It has been found that even some deformation has no disadvantageous effect on the tightness of the insulation. I preferably use a curved breaker strip 5 in case there should be any relative movement of the shells 3 and 4, so as to avoid stresses in strip 5 and the joints between strip 5 and the walls 3 and 4. Also the longer the path of travel of heat through the strip 5 the better. In accordance with the invention the breaker strip 5 can be extremely thin. It can be of a thickness of only a few millimeters, or even of only a few tenths of a millimeter, in spite of the fact that there is a gaseous pressure differential on it equal to atmospheric pressure. For this reason there is little heat transmission through the strip 5. The other walls of the insulation can advantageously be made of a thickness of from 0.2 to 0.7 mm.

The space 2 is preferably evacuated to a pressure which is above absolute vacuum and preferably of an order of magnitude of 0.1 to 10 mm. Hg. At such pressures there is a great decrease in heat transmission through the insulation compared to insulations of usual construction. When the desired pressure has been obtained within the insulation space 2 the valve 16 is closed. As shown in Fig. 6, the valve stem 17 may be screwed in to close the valve and a protection cap 18 may be applied exteriorly thereof. The complete insulation receptacle is taken out of the form after the cover plate 14 has been removed and the side plates retracted.

By using spring resistance devices or the like in connection with the turnbuckles 12 the forming apparatus itself may constitute an indicator of the internal pressure produced in the form. If such an expedient is used limiting devices should be applied so that the insulation will not be deformed. In order to make the insulation joints accessible for test the apparatus shown in Figs. 4 and 5 may be provided with recesses or the like near these joints. The branches of the pipe system 15 may be made to extend to any desired places within the space 2. In order not to clog any of the holes 19 in the pipe 15 the pipe may have string or wire or the like wound around the same and cloth or other mesh wound over the string. Then additional string or the like may be wound around the mesh. The pipe 15 must be of such construction as to withstand atmospheric pressure. For this reason they are advantageously made of circular cross section.

In Fig. 7 is shown a modified form of valve for the evacuation system. Within the valve body 25 is a coil of soldering wire 26. This wire is around pipe connection 27 which communicates with the pipe system 15. Soldering paste is inserted along with the soldering wire. When the evacuation is completed and before shutting off the pump the valve body is heated while in inverted position, so that the soldering wire melts and fills the dish-shaped cup 25, thereby covering the mouth of the pipe 27. This hermetically seals the space 2 after the vacuum pump is disconnected from the pipe 28.

In Fig. 8 is shown a refrigerator cabinet provided with insulation in accordance with the present invention. The cabinet includes an outer shell 30 and a liner 31. The vacuum insulation is placed between these parts. In the construction shown in Fig. 8, instead of beading and soldering the joints they are hermetically sealed by means of roll welding. The liner and the outer wall protect the thin metal of the vacuum insulation from injury. As is usual in refrigerator cabinet construction, a Bakelite or other breaker strip 33 connects the inner and outer shells and a wood frame 34 may be provided at the forward corners. The vacuum insulation is preferably mounted as a unit from the rear, the back plate of the outer shell being removable. In the cabinet shown in Fig. 8 a slab of vacuum insulation 35 is provided in the door, which slab is made in accordance with the present invention. This slab is enclosed between the plates 36 and 37 and kept in place by a wooden framework 38. The transverse walls 39 extending in the direction of heat flow are made of a metal of poor heat conductivity supported by the filling material in the manner above described. A breaker strip 40 is provided between the front and rear panels of the door to hinder heat transmission. The outer (warm) wall of the insulation is preferably pressed against packing means 41, for instance of rubber, disposed in the frame 34 on the front side of the cabinet in order to prevent warm atmospheric air from entering the space between the insulation and the inner liner 31. For the same purpose the strip 33 may be tightly secured to the liner 31 and the frame 34.

It will be understood from the foregoing that the mass filling the space 2 must be of such character that in spite of being compressed it has communicating cells or pores. At the same time it must be of such quality that it does not emit gases after evacuation. As above indicated, kieselguhr is a suitable substance, and other substances may be soot and finely powdered metallic oxides. While fibrous materials could be used in certain cases, I prefer to use materials of the character of kieselguhr or carbon powder.

The insulation effect is better, the lower the pressure which is obtained in the space 2, and for this reason the evacuation may be carried out within a large oven at a temperature which is as high as possible such as 200–400° C. without destroying the filling material. In this way volatile products as, for example, water, may be expelled, and a further decrease in pressure is obtained after evacuation due to lowering of temperature. The moisture present in the filling mass may also be removed by heating the mass before filling it into the insulation. The metallic casing of the insulation may also be treated before the mass is filled into the same for the purpose of expelling gases which are dissolved in the metal. Instead of air as a residual gas in the space 2 the residual gas may be one of lower heat conductivity than air, for instance, a gas of very high molecular weight. This may be a gas which is liquid at ordinary pressures and temperatures. In such case the insulation is preferably evacuated before the gas is introduced, so far as this is possible. A number of evacuations or alternate fillings with special gas and evacuations may take place. Should the metal casing have minute cracks or holes in the welds or otherwise, it may be treated or painted with any suitable solution, such as varnish, lacquer, before the evacuation so that the solution is sucked into such holes and seals the same.

From the foregoing it will be understood that the invention is not limited to a particular apparatus nor to a particular set of steps.

What I claim is:

1. Method of making a heat insulating structure which includes forming a container of thin, flexible material, filling the container with a finely divided solid material, holding the container to its ultimate shape while pressing in the filler into the container so that the filler exerts a mechanical pressure against the container, closing the container, and removing gas from within the container, whereby preponderance of external gaseous pressure is offset by the pressure exerted by the filling material.

2. Method of making an insulation which includes forming a container of thin flexible metal plating, filling the container with a finely divided solid material, holding the container to its utimate shape while pressing in the filler to exert a mechanical pressure tending to bulge the container walls outwardly, closing the container to atmosphere, and producing a lesser pressure than atmosphere within the container, whereby preponderance of external gaseous pressure is resisted by internal mechanical pressure.

3. Method of making a heat insulating structure which includes forming a container of thin, flexible material, filling the container with a finely divided solid material, holding the container to its ultimate shape while pressing in the filler so that the outwardly acting pressure of said filler on the container walls is above approximately one atmosphere, closing the container, and evacuating the container so that atmospheric pressure exteriorly thereof is balanced by the material within the container.

4. Insulation including a container made of flexible sheet material and hermetically sealed and containing a filler capable of taking the form of the container, said filler being so packed into the container that if the gaseous pressure within the container were one atmosphere the total outwardly acting pressure on the container walls would be approximately two atmospheres, the container being evacuated so that the actual pressure is approximately one atmosphere.

5. Insulation including a casing made of flexible sheet material and containing a finely divided filler adapted to sustain said casing against external atmospheric pressure, said casing having an opening for evacuating the same, and piping connected to said opening and perforated to communicate with different places of said filler, and mesh placed around the piping to prevent entry of material thereinto.

6. Method of making an insulation which includes forming a container of thin flexible metal plate, filling the container with a finely divided solid material, holding the container to its ultimate shape while introducing the filler in such manner that the filler tends to bulge the container walls outwardly, closing the container to atmosphere, and producing a lesser pressure than atmosphere within the container.

7. Method of making an insulation which includes forming a container of thin flexible metallic material, introducing into the container a filler material, said filler material having such properties that particles thereof move one upon the other and adapt themselves to the shape of the container, holding the container to its ultimate shape while introducing the filler material in such a manner that the filler material tends to bulge the container walls outwardly, closing the container to atmosphere, and producing a lesser pressure than atmosphere within the container.

8. In combination with an evacuated casing having an opening adapted to be closed to the atmosphere, said casing being made of a flexible sheet material, of a finely divided filler having sufficient mass to resist flow of air when in place and adapted to sustain said casing against external atmospheric pressure, and channel means extending within the filler to points remote from the said opening, said channel means being unobstructed by the finely divided filler to facilitate the evacuation of the casing.

9. Insulation including a casing formed by flexible metallic sheeting and containing a filler having sufficient mass to resist flow of air when in place and adapted to sustain said casing against external atmospheric pressure, said casing having an opening adapted to be sealed after said casing is evacuated at the opening, channels extending within the filler to points remote from the said opening affording communication between different regions of said filler and the said opening at a plurality of distances from the latter, such communication being unobstructed by said filler to facilitate the evacuation.

CARL GEORG MUNTERS.